Oct. 14, 1969  LE ROY HART  3,472,542

FASTENER

Filed Sept. 28, 1966

INVENTOR.
LeRoy Hart.
BY
Louis V. Lucia
ATTORNEY.

United States Patent Office 3,472,542
Patented Oct. 14, 1969

3,472,542
FASTENER
Le Roy Hart, 50 Woodland St., Plainville, Conn. 06062
Filed Sept. 28, 1966, Ser. No. 582,704
Int. Cl. F16b 5/02, 2/02
U.S. Cl. 287—189.36                                   2 Claims

ABSTRACT OF THE DISCLOSURE

A fastening device for quickly aligning and fastening two or more members together.

The device includes a screw member and nut member. One of the members has a pilot portion to guide the fastener in the workpiece opening, stop lugs to limit rotation of the member, and wing portions to engage the workpiece in the fastened position.

Summary of the invention

A fastening device which can be applied to the members to be fastened from the front and operated by a simple tool, such as a screw driver, or wrench, to fasten or unfasten said members.

An object of the invention is to provide an improved fastener which is simple in its construction, inexpensive to manufacture and easy to use.

Further objects and advantages of this invention will be readily understood from the following description and the accompanying drawing in which.

Figure 1:
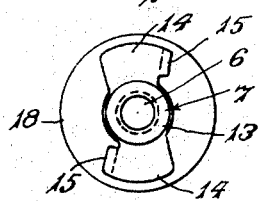
FIG. 1 is a rear view of the fastener embodying the present invention.
Figure 2:
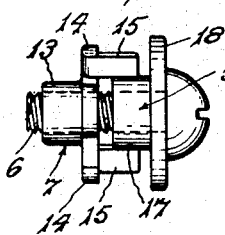
FIG. 2 is an elevational side view thereof.
Figure 3:
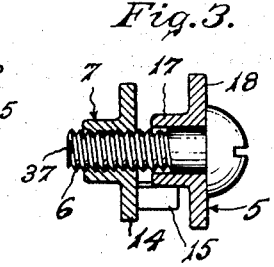
FIG. 3 is a sectional side view of said fastener.
Figure 4:
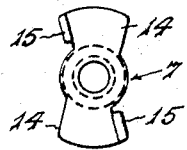
FIG. 4 is a front view of the nut member of said fastener.
Figure 5:
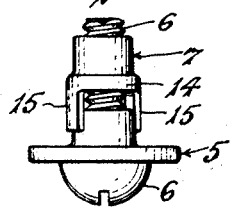
FIG. 5 is a bottom view thereof.
Figure 6:
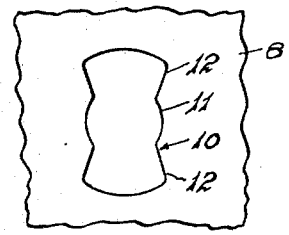
FIG. 6 is a fragmental front view of a plate member illustrating the shape of the hole therein for receiving the said fastener.
Figure 7:
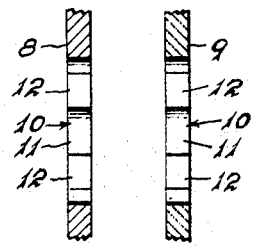
FIG. 7 is a sectional fragmental side view showing two of said plate members which can be fastened together with my improved fastener.
Figure 8:
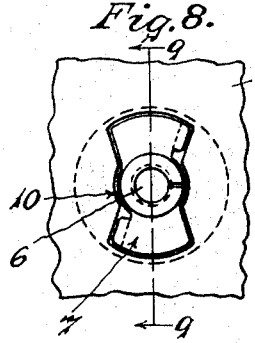
FIG. 8 is a rear view showing said fastener inserted through the holes in the plate member.
Figure 9:
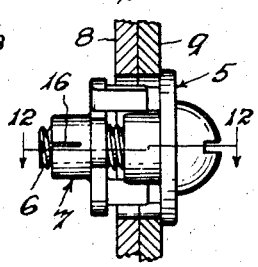
FIG. 9 is a side view showing the plate members in section on line 9—9 of FIG. 8.

As illustrated in said drawing, my improved fastener comprises mainly a bushing 5, a screw 6 extending through and rotatable in said bushing, and an oblong nut 7 threaded to said screw.

The said fastener is particularly adapted for fastening together two members, such as the plates 8 and 9 but may also be used for fastening more than two of such members by simply providing the screw 6 in the appropriate length.

Each of said members is provided with a bow shaped hole 10 having a partly circular centering portion 11 and radial wing portions 12—12 extending from opposite sides of said centering portion.

Figure 10:
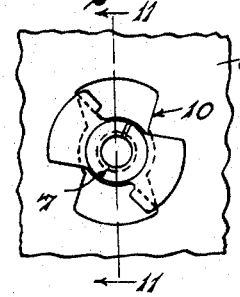
FIG. 10 is a rear view similar to FIG. 8 but showing the fastener in fastening and tightened position.
Figure 11:
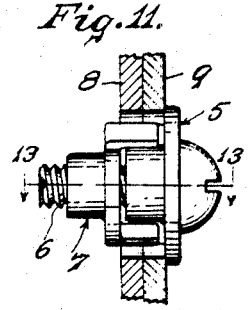
FIG. 11 is a sectional side view on line 11—11 of FIG. 10.
Figure 12:
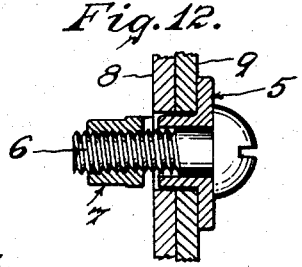
FIG. 12 is a sectional plan view on line 12—12 of FIG. 9.
Figure 13:
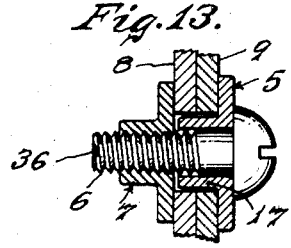
FIG. 13 is a similar view on line 13—13 of FIG. 11.

The nut 7 is shaped to fit through said hole and has an axial tubular portion 13, which is internally threaded to receive the thread of the screw 6, wing portions 14—14, to engage the rear surface of the inner plate 8, and stop lugs 15—15 projecting forwardly from said wing portions into the radial wing portions 12—12 of the holes 10 in the plates 8 and 9 to stop rotation of said nut when the screw 6 is being rotated. The said portion 13 projects inwardly from the nut 7 and acts as a pilot to guide the fastener in said holes as it enters the centering portions 11 thereof. If desired, the said portion 13 may be formed with a slit 16 and made to fit snugly on the thread of the screw to provide friction for causing said nut to rotate with the screw into the fastening position shown clearly in FIG. 10.

The screw 6 is rotatable in the bushing 5 and said bushing has a tubular centering and aligning portion 17, which fits into the portions 11 of the holes 10 in the plates 8 and 9 to center the fastener therein and also aligns said plates and accurately retains them in position relatively to each other, and a flange 18 which covers the said holes 10.

It will be noted that in its normal position the nut 7 is spaced from the flange 18 for a distance greater than the total thickness of the plates 8 and 9 or other members which are to be fastened together.

In the use of my improved fastener, the front plate 9 is first placed against the rear plate 8 so that the holes 10 in both plates are in register. The faster is then inserted into the said holes by passing the tubular portion 13 of the nut 7 through the centering portions 11 of said holes and thereby guiding the tubular portion 17 of the bushing into the centering portions 11 of said holes and thus aligning the plates. The screw 6 is then simply rotated clockwise and this will cause the nut 7 to rotate with said screw until the stop lugs 15—15 engage the respective sides of the wing portions 12—12 of the holes and further rotation of said screw will draw the nut forwardly against the rear surface of the inner plate 8 and thereby securely fasten the two plates together.

When it is desired to remove the fastener to unfasten said plates, the screw 6 is simply rotated in the reverse direction to loosen the nut 7 which will then rotate with the screw until the stop lugs 15—15 engage the opposite sides of the said wing portions 12—12 of the holes and thus align the nut with said holes whereby the fastener may be easily withdrawn from said holes from the outer side of the front plate 9.

Figure 14:
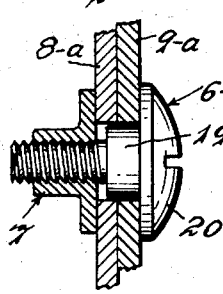
FIG. 14 is a view similar to FIG. 13 but showing a modified form of said fastener.

As illustrated in FIG. 14, the bushing 5 may be eliminated and the screw 6-a may be made in a single piece with a centering portion 19 and an enlarged head portion 20 to function for the tubular portion 17 and the flange 18 of said bushing.

Figure 15:
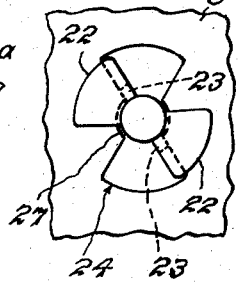
FIG. 15 is a rear view showing a further modified form of said fastener.
Figure 16:
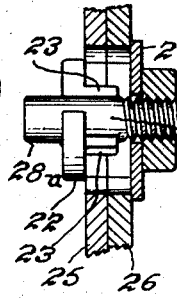
FIG. 16 is a sectional side view thereof.

In the form shown in FIGS. 15 and 16, the bolt 21 has radial wings 22—22 which are integral therewith and function for the wings of the nut 7. Said wing portions have the stop lugs 23—23 which extend into the holes 24 in the plates 25 and 26. In this form, the said holes are of a slightly different shape than the holes 10 and the partly circular centering portions 27 thereof are of a size to fit the shank 28 of the bolt and thereby centering the fastener in the holes and aligning the plates. The said bolt also has an extension 28-a which functions as a guide for the fastener as it is inserted into the holes 24. A washer 29 is provided on said bolt to cover the holes 24 and a nut 30 is threaded to said bolt to draw the head tight against the rear surface of the inner plate 25.

Figures 17, 18:
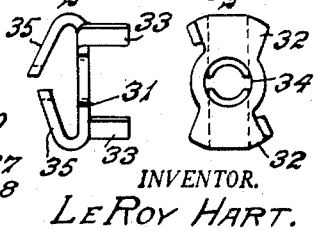
FIG. 17 is a side view of a modified form of a nut for said fastener.
FIG. 18 is a front view of said nut.

The nut 7 may be modified to the form shown in FIGS. 17 and 18 wherein the same is constructed of spring sheet metal and comprises a body portion 31 shaped to fit through the holes 10 and having wing portions 32—32 with stop lugs 33—33 projecting forwardly therefrom and a hole 34 through which the screw 6 extends. Spring prongs 35—35 extend inwardly and rearwardly from said body portion and have notched end portions to receive the thread of said screw therebetween.

If desired, the threads at the ends of the screws 6 and 6-a may be deformed, as indicated at 36, to prevent the respective nut from falling off the fastener from excessive turning of said screws, particularly when the fastener is being removed from fastening position.

Also, the front end of the bolt 21 may be provided with a slot 37 to facilitate rotation of said bolt.

I claim:

1. For a plurality of separate members to be fastened together, said members each having an oblong hole therethrough with a round centering portion and wing portions extending from said centering portion, a fastener including a screw, an oblong nut threaded to said screw and adapted to be passed through said oblong holes, said nut having wing portions to engage the rear surface of one of said separate members to fasten said separate members together, said nut being rotatable with said screw upon initial rotation thereof and having a stop lug projecting forwardly therefrom into said hole to engage an edge portion thereof and thereby limit rotation of said nut to cause said wing portions to be tightened against said rear surface upon further rotation of said screw, and a round guide portion on said nut fitting said round centering portion of said hole to guide said fastener into said hole.

2. For a plurality of separate members to be fastened together, said members each having an oblong hole therethrough with a round centering portion and wing portions extending from said centering portion, a fastener including a pair of threaded members in threaded engagement with each other, one of said threaded members having a round shank portion of a size and shape to fit and rotate within said centering portions and align said separate members, wing portions extending from said shank portion and fitting said wing portions of the holes, and a stop projection extending from said one threaded member in the opposite direction from said round portion of the shank to project into a wing portion of at least one of the holes; said one threaded member being rotatable to place the wing portions thereof in position to engage the rear surface of one of said separate members and said projection being engageable with a side edge of said wing portion of the hole to stop rotation of said one threaded member and cause tightening of the wing portions thereof against said rear surface to fasten said separate members together upon rotation of said other threaded member.

References Cited

UNITED STATES PATENTS

| | | | |
|---|---|---|---|
| 1,062,635 | 5/1913 | Clements | 85—9 |
| 1,470,608 | 10/1923 | Hine | 85—9 |
| 1,939,034 | 12/1933 | Bennett | 85—9 |
| 1,958,497 | 5/1934 | Rivers. | |
| 2,172,827 | 9/1939 | Becker | 85—5 |
| 2,360,274 | 10/1944 | Rapp | 151—7 |
| 2,377,694 | 6/1945 | Judd | 85—36 |
| 2,390,325 | 12/1945 | Rapp | 85—32 |
| 2,704,680 | 3/1955 | Bedford | 287—20.5 |
| 2,931,471 | 4/1960 | Howard | 24—221 X |
| 3,123,389 | 3/1964 | Biesecker | 24—221 X |
| 3,150,703 | 9/1964 | Preziosi | 151—7 |

FOREIGN PATENTS 576,676   5/1958   Italy.

EDWARD C. ALLEN, Primary Examiner

U.S. Cl. X.R.

85—9, 32